(12) United States Patent
Stotzer et al.

(10) Patent No.: US 6,799,266 B1
(45) Date of Patent: Sep. 28, 2004

(54) METHODS AND APPARATUS FOR REDUCING THE SIZE OF CODE WITH AN EXPOSED PIPELINE BY ENCODING NOP OPERATIONS AS INSTRUCTION OPERANDS

(75) Inventors: Eric J. Stotzer, Houston, TX (US); Elana D. Granston, Sugar Land, TX (US); Alan S. Ward, Sugar Land, TX (US)

(73) Assignee: Texas Instruments Incorporated, Dallas, TX (US)

( * ) Notice: Subject to any disclaimer, the term of this patent is extended or adjusted under 35 U.S.C. 154(b) by 577 days.

(21) Appl. No.: 09/702,484

(22) Filed: Oct. 31, 2000

Related U.S. Application Data
(60) Provisional application No. 60/173,795, filed on Dec. 30, 1999, provisional application No. 60/183,357, filed on Feb. 18, 2000, and provisional application No. 60/183,527, filed on Feb. 18, 2000.

(51) Int. Cl.[7] .......................... G06F 9/345; G06F 9/38
(52) U.S. Cl. .................. 712/219; 712/227; 712/234; 712/245
(58) Field of Search ................... 712/219, 227, 712/234, 245, 24, 213, 294, 212, 221, 223, 226, 235; 713/401

(56) References Cited

U.S. PATENT DOCUMENTS

| 5,515,519 A |   | 5/1996 | Yoshioka et al. |
| 5,590,294 A | * | 12/1996 | Mirapuri et al. ............ 712/244 |
| 5,958,044 A |   | 9/1999 | Brown et al. |
| 6,044,450 A | * | 3/2000 | Tsushima et al. ............. 712/24 |
| 6,499,096 B1 | * | 12/2002 | Suzuki ...................... 712/0.24 |

FOREIGN PATENT DOCUMENTS

| WO | WO 98 06042 A | 2/1998 |

* cited by examiner

*Primary Examiner*—Daniel H. Pan
(74) *Attorney, Agent, or Firm*—Robert D. Marshall, Jr.; W. James Brady, III; Frederick J. Telecky, Jr.

(57) ABSTRACT

A method for reducing total code size in a processor having an exposed pipeline may include the steps of determining a latency between a load instruction, and a using instruction and inserting a NOP field into the defining or using instruction. When inserted into the load instruction, the NOP field defines the following latency following the load instruction. When inserted into the using instruction, the NOP field defines the latency preceding the using instruction. In addition, a method for reducing total code size during branching may include the steps of determining a latency following a branch instruction for initiating a branch from a first point to a second point in an instruction stream, and inserting a NOP field into the branch instruction. Further, a method according to this invention may include the steps of locating delayed effect instructions followed by NOPs, such as load or branch instructions, within a code; deleting the NOPs from the code; and inserting a NOP field into the delayed effect instructions. Apparatus according to this invention may include a processor including a code containing a delayed effect instruction, wherein the delayed effect instruction includes a NOP field.

17 Claims, 4 Drawing Sheets

| OPCODE | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| OFFSET | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| NAME | creg | | | z | | scst12 | | | | | | | | | | | ucst3 | | | 0 | 0 | 0 | 0 | 1 | 0 | 0 | 1 | 0 | 0 | 0 | s | p |
| WIDTH | 3 | | | 1 | | 12 | | | | | | | | | | | 3 | | | 1 | | | 10 | | | | | | | | 1 | 1 |

FIG. 4a

OPCODE

| OFFSET | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| NAME | creg | | | z | | scst12 | | | | | | | | | | | ucst3 | | | | 0 | 0 | 0 | 0 | 1 | 0 | 0 | 0 | 0 | 0 | s | p |
| WIDTH | 3 | | | 1 | | 12 | | | | | | | | | | | 3 | | | | | | | | | | | | | | 1 | 1 |

FIG. 4b

| PIPELINE STAGE | E1 | PS | PW | PR | DP | DC | E1 |
|---|---|---|---|---|---|---|---|
| READ | src2 | | | | | | |
| WRITTEN | PC | | | | | | |
| BRANCH TAKEN | |←|—|N|—|→| x |
| UNIT IN USE | .S | | | | | | |

FIG. 5a

OPCODE

| OFFSET | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| NAME | creg | | | z | | | | | | src2 | | | | | 0 | 0 | ucst3 | | | x | 0 | 0 | 1 | 1 | 0 | 1 | 1 | 0 | 0 | 0 | 1 | p |
| WIDTH | 3 | | | 1 | | | | | | 5 | | | | | 2 | | 3 | | | 1 | | | | | | | | | | | 1 | 1 |

FIG. 5b

| PIPELINE STAGE | E1 | PS | PW | PR | DP | DC | E1 |
|---|---|---|---|---|---|---|---|
| READ | src2 | | | | | | |
| WRITTEN | PC | | | | | | |
| BRANCH TAKEN | | | | | | | x |
| UNIT IN USE | .S2 | | | | | | |

METHODS AND APPARATUS FOR REDUCING THE SIZE OF CODE WITH AN EXPOSED PIPELINE BY ENCODING NOP OPERATIONS AS INSTRUCTION OPERANDS

This application claims priority under 35 USC §119(e)(1) of Provisional Application No. 60/173,795, filed Dec. 30, 1999 (TI-26738P1); Provisional Application No. 60/183,357, filed Feb. 18, 2000 (TI-26738P2); and Provisional Application No. 60/183,527, filed Feb. 18, 2000 (TI-30302PS).

BACKGROUND

1. Field of the Invention

The invention relates to methods and apparatus for reducing code size of instructions on a microprocessor or microcontroller, e.g., on digital signal processing devices, with instructions requiring NOPs (hereinafter "processors"). In particular, the invention relates to methods and apparatus for reducing code size on architectures with an exposed pipeline, such as a very large instruction word (VLIW), by encoding NOP operations as an instruction operand.

2. Description of Related Art

VLIW describes an instruction-set philosophy in which a compiler packs a number of relatively simple, non-interdependent operations into a single instruction word. When fetched from a cache or memory into a processor, these words are readily broken up and the operations dispatched to independent execution units. VLIW may perhaps best be described as a software- or compiler-based, superscalar technology. VLIW architectures frequently have exposed pipelines.

Delayed effect instructions are instructions, in which one or more successive instructions may be executed before the initial instructions effects are complete. NOP instructions are inserted to compensate for instruction latencies. A NOP instruction is a dummy instruction that has no effect. It may be used as an explicit "do nothing" instruction that is necessary to compensate for latencies in the instruction pipeline. However, such NOP instructions increase code size. For example, NOPs may be defined as a multiple cycle NOP or a series of individual NOPs, as follows:

| Example A: | Example B: |
| --- | --- |
| inst | inst |
| nop m | nop |
|  | nop |
|  | ... |
|  | nop |

NOPs occur frequently in code for VLIWs.

Often NOP instructions are executed for multiple sequential cycles. The c6x series architecture has a multi-cycle NOP for encoding a sequence of NOP instructions. c6000 platform, available from Texas Instruments, Inc., of Dallas, Tex., provides a range of fixed- and floating-point digital signal processors (DSPs) that enable developers of high-performance systems to choose the device suiting their specific application. The platform combines several advantageous feature with DSPs that achieve enhanced performance, improved cost efficiency, and reduced power dissipation. As some of the industry's most powerful processors, the c6000 platform, available from Texas Instruments, Inc., of Dallas, Tex., offers c62x fixed-point DSPs with performance levels ranging from 1200 million instructions per second (MIPS) up to 2400 MIPS. The c67x floating-point devices range from 600 million floating-point operations per second (MFLOPS) and to above the 1 GFLOPS (1 billion floating-point operations per second) level. To accommodate the performance needs of emerging technologies, the c6000 platform provides a fixed-point and floating-point code compatible roadmap to 5000 MIPS for the c62x generation fixed-point devices and to more than 3 GFLOPS for the floating-point devices.

Load (LD) and branch (B) instructions may have five (5) and six (6) cycle latencies, respectively. A latency may be defined as the period (measured in cycles or delay slots) within which all effects of an instruction are completed. Instruction scheduling is used to "fill" these latencies with other useful operations. Assuming that such other instructions are unavailable for execution during the instruction latency, NOPs are inserted after the instruction issues to maintain correct program execution. The following are examples of the use of NOPs in current pipelined operations:

| Example 1a: | |
| --- | --- |
| LD *a0, a5 | % load a5 to a0 (one (1) cycle) |
| NOP 4 | % no operations for four (4) cycles (delay slots) |
| ADD a5, 6, a7; | % a5 value available |
| Example 2a: | |
| B Label | % a branch to label instruction (one (1) cycle) |
| NOP 5 | % no operations for five (5) cycles (delay slots) |
| ; | % branch occurs |

Although NOPs are used to compensate for delayed effects of other instructions, NOPs may be associated with other types of instructions having a latency greater than one (1). Generally complex operations, load instructions that read memory, and control flow instructions (e.g., Branches) have latencies greater than one (1), and their execute phases may take multiple cycles.

Pipelining is a method for executing instructions in an assembly-line fashion. Pipelining is a design technique for reducing the effective propagation delay per operation by partitioning the operation into a series of stages, each of which performs a portion of the operation. A series of data is typically clocked through the pipeline in sequential fashion, advancing one stage per clock period.

The instruction is the basic unit of programming that causes the execution of one operation. It consists of an op-code and operands along with optional labels and comments. An instruction is encoded by a number of bits, N. N may vary or be fixed depending on the architecture of a particular device. For example, the c6x family of processors, available from Texas Instruments, Inc., of Dallas, Tex., has a fixed, 32-bit instruction word. A register is a small area of high speed memory, located within a processor or electronic device, that is used for temporarily storing data or instructions. Each register is given a name, contains a few bytes of information, and is referenced by programs.

In one example of an instruction pipeline, the pipeline may consist of fetch, decode, and execute stages. Each of these stages may take multiple cycles. For example, the instruction-fetch phase is the first phase of the pipeline. The phase in which the instruction is fetched from program-memory. The instruction-decode phase is the next phase of the pipeline; the phase in which the instruction is decoded.

The operand-fetch phase is the third phase of the pipeline, in which an operand or operands are read from the register file. Operands are the parts of an instruction that designates where the central processing unit (CPU) will fetch or store information. The operand consists of the arguments (or parameters) of an assembly language instruction. Finally, in the instruction-execute phase, the instruction is executed. An instruction register (IREG) or (IR) is a register that contains the actual instruction being executed, and an instruction cache is an on-chip static RAM (SCRAM) that contains current instructions being executed by one of the processors.

SUMMARY OF THE INVENTION

Thus, a need has arisen for a method and apparatus for reducing or minimizing code size by reducing the number of NOP instructions and a method for reducing the total and average code size for codes developed for use with an exposed pipeline and on processors. Because the insertion of NOPs as separate instructions increases code size, by including the NOP as a field within an existing instruction, code size may be reduced.

Further, the need has arisen to reduce the cost of processors by reducing the memory requirements for such devices. Reducing code size reduces total system cost by lessening or minimizing the amount of physical memory required in the system. Reducing code size also may improve system performance by allowing more code to fit into on-chip memory, i.e., memory that is internal to the chip or device, which is a limited resource.

Moreover, the need has arisen to increase the performance and capabilities of existing processors by reducing the memory requirements to perform current operations. It also may improve performance in systems that have program caches.

In addition, the need has arisen for methods for reducing the total power required to perform the signal processing operations on existing and new devices. Reducing code size also reduces the amount of power used by a chip, because the number of instructions that are fetched may be reduced.

In an embodiment, the invention also is a method for reducing total code size in a device having an exposed pipeline, e.g., in a processor. The method may comprise the steps of determining a latency between a defining instruction, e.g., a load instruction, and a using instruction and inserting a NOP field into the defining or using instruction or into an intervening instruction. For example, latencies may be determined by searching the code to identify periods (measured in cycles or delay slots) within which all effects of an instruction are to be completed, e.g., branching steps involving the switching of program control to a nonsequential program-memory address. When inserted into the defining instruction, the NOP field defines the following latency following the defining instruction. When inserted into the using instruction, the NOP field defines the latency preceding the using instruction. Because the defining or using instruction may have insufficient space to accommodate the NOP field, it may be convenient or desirable to place the NOP field in an intervening instruction. Generally, defining instructions "define" the value of some variable, while using instructions employ a defined variable, e.g., within some mathematical or logical operation. Further, when inserted into an intervening instruction, the NOP field may indicate that the delay occurs before or after the intervening instruction.

In another embodiment, the invention is a method for reducing total code size during branching, e.g., in a processor. The method may comprise the steps of determining a latency after a branch instruction for initiating a branch to a new (non-successive) point in an instruction stream, e.g. from a first point to a second point in an instruction stream, and inserting a NOP field into the branch instruction.

In yet another embodiment, the invention is an apparatus having reduced total code size. The apparatus may comprise a processor including at least one defining instruction followed by at least one using instruction wherein a latency between the at least one defining instruction, e.g., a load instruction, and the at least one using instruction. The at least one defining or the at least one using instruction or an intervening instruction may include a NOP field. As noted above, when inserted into the defining instruction, the NOP field defines the following latency following the defining instruction. When inserted into the using instruction, the NOP field defines the latency preceding the using instruction. Further, when inserted into an intervening instruction, the NOP field may indicate that the delay occurs before or after the intervening instruction.

In still another embodiment, the invention is an apparatus for reducing total code size during branching. The apparatus may comprise a processor including at least one branch instruction for branching to a new (non-successive) point in an instruction stream, e.g., from a first point to a second point in an instruction stream. A latency exists in a shift between the first point and the second point, e.g., the latency following a branch instruction. The at least one branch instruction includes a NOP field corresponding to the latency.

In yet a further embodiment, the invention is a method comprising the steps of locating at least one delayed effect instruction followed by NOPs (either serially or as a multiple-cycle NOP), such as load or branch instructions, within a code; deleting the NOPs from the code; and inserting a NOP field into a delaying instruction, such as the at least one delayed effect instruction. Alternatively, the NOPs may be replaced by including a NOP field in an intervening instruction or another appropriately positioned instruction within the code. Further, the NOPS may precede or follow the delaying instruction. In addition, once delayed effect instructions have been located, the code may be reordered to facilitate replacement of NOPs with NOP fields.

In still a further embodiment, the invention is an apparatus comprising a processor including a code containing at least one delayed effect instruction. At least one of the at least one delayed effect instruction includes a NOP field, thereby replacing NOPs.

Other objects, features, and advantages will be apparent to persons skilled in the art by the following detailed description.

BRIEF DESCRIPTION OF THE DRAWINGS

The present invention may be more readily understood with reference to the following drawings in which:

FIG. 4a depicts an example of a 32-bit Opcode instruction to perform a relative branch with NOPs (BNOP) operation;

and FIG. 4b depicts the pipeline format for performing a relative BNOP operation; and FIG. 5a depicts an example of a 32-bit Opcode instruction to perform an absolute BNOP operation, and FIG. 5b depicts the pipeline format for performing an absolute BNOP operation.

DETAILED DESCRIPTION OF PREFERRED EMBODIMENTS

Data processing devices suitable for use with and incorporating this invention are described in U.S. patent application Ser. No. 09/703,096 entitled "Microprocessor with Improved Instruction Set Architecture", and is incorporated herein by reference. In an embodiment of the present invention, there are 64 general-purpose registers. General purpose registers A0, A1, A2, B0, B1 and B2 each may be used as a conditional register. Further, each .D unit may load and store double words (64 bits). The .D units may access words and double words on any byte boundary. The .D unit supports data as well as address cross paths. The same register may be used as a data path cross operand for more than one functional unit in an execute packet. A delay clock cycle is introduced when an instruction attempts to read a register via a cross path that was updated in the previous cycle. Up to two long sources and two long results may be accessed on each data path every cycle.

Each .M unit may perform two 16×16 bit multiplies and four 8×8 bit multiplies every clock cycle. Special communications-specific instructions, such as SHFL, DEAL, and GMPY4, are associated with the .M unit to address common operations in error-correcting codes. Bit-count, Bit-Reverse, and Rotate hardware on the .M unit extends support for bit-level algorithms, such as binary morphology, image metric calculations and encryption algorithms.

Increased orthogonality of the Instruction Set Architecture is provided, such that the .M unit may perform bi-directional variable shifts in addition to the .S unit's ability to do shifts. Such bi-directional shifts directly assist voice-compression codes (vocoders).

The Microprocessor

Figure 1:
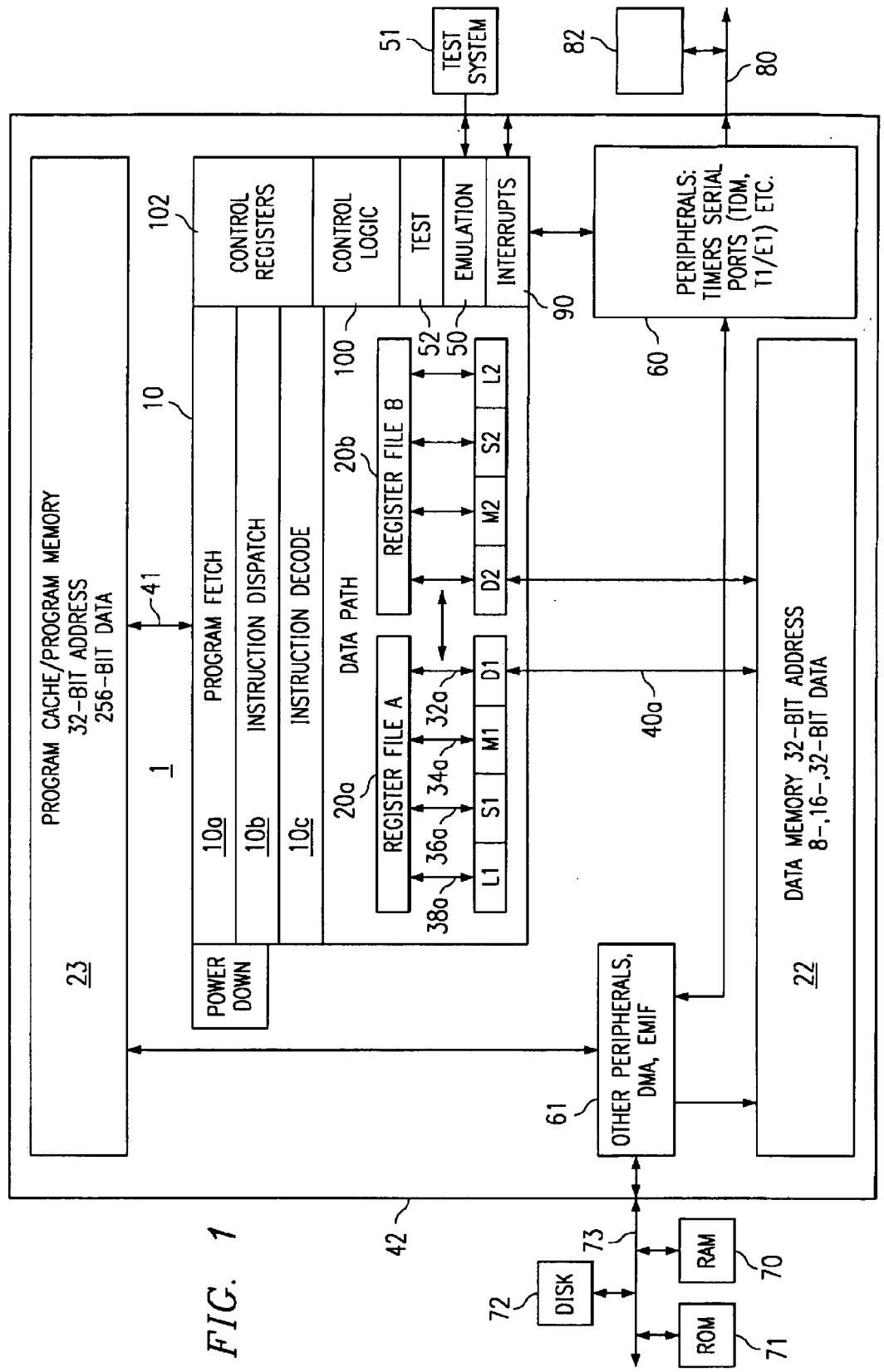
FIG. 1 is a block diagram of a digital signal processor (DSP)

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud et al., describes a DSP in detail and is incorporated herein by reference. U.S. Pat. No. 5,329,471 issued to Gary Swoboda et al., describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Instructions are fetched by fetch unit 10a from instruction memory 23 over a set of busses 41. Decoded instructions are provided from the instruction fetch/decode unit 10a–c to the functional units D1, M1, S1, and L1 over various sets of control lines which are not shown. Data are provided to/from the register file 20a from/to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a. Note that the entire data path described above is duplicated with register file 20b and execution units D2, M2, S2, and L2. Load/store unit D2 similarly interfaces with memory 22 via a second set of busses. Instructions are fetched by fetch unit 10a from instruction memory 23 over a set of busses 41. Emulation circuitry 50 provides access to the internal operation of integrated circuit 1 which may controlled by an external test/development system (XDS) 51.

External test system 51 is representative of a variety of known test systems for debugging and emulating integrated circuits. One such system is described in U.S. Pat. No. 5,535,331, which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 may just as well be external to the microprocessor 1 integrated circuit 42, or part of it may reside on the integrated circuit 42 and part of it be external to the integrated circuit 42.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller part of functional block 61 connects to data memory 22 via a bus and is generally used to move data between memory and peripherals within microprocessor 1 and memory and peripherals which are external to microprocessor 1.

Register File Cross Paths

Each functional unit reads directly from and writes directly to the register file within its own data path. That is, the .L1, .S1, .D1, and .M1 units write to register file A 20a and the .L2, .S2, .D2, and .M2 units write to register file B 20b. The register files are connected to the opposite-side register file's functional units via the 1X and 2X cross paths. These cross paths allow functional units from one data path to access a 32-bit operand from the opposite side's register file. The 1X cross path allows data path A's functional units to read their source from register file B. Similarly, the 2X cross path allows data path B's functional units to read their source from register file A.

All eight of the functional units have access to the opposite side's register file via a cross path. The .M1, .M2, .S1, .S2, .D1 and .D2 units' src2 inputs are selectable between the cross path and the same side register file. In the case of the .L1 and .L2 both src1 and src2 inputs also are selectable between the cross path and the same-side register file.

Only two cross paths, 1X and 2X, exist in this embodiment of the architecture. Thus, the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, available from Texas Instruments, Inc, of Dallas Tex., only one functional unit per data path, per execute packet may obtain an operand from the opposite register file.

S2 unit may write to control register file 102 from a dst output via a bus (not shown). S2 unit may read from control register file 102 to its src2 input via a bus (not shown).

A delay clock cycle is introduced whenever an instruction attempts to read a register via a cross path that was updated in the previous cycle. This is known as a cross path stall. This stall is inserted automatically by the hardware; no NOP instruction is required. However, no stall is introduced if the register being read is the destination for data loaded by a LDx instruction.

Memory, Load, and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations may be scheduled on a datapath in the same execute packet.

Figure 2:
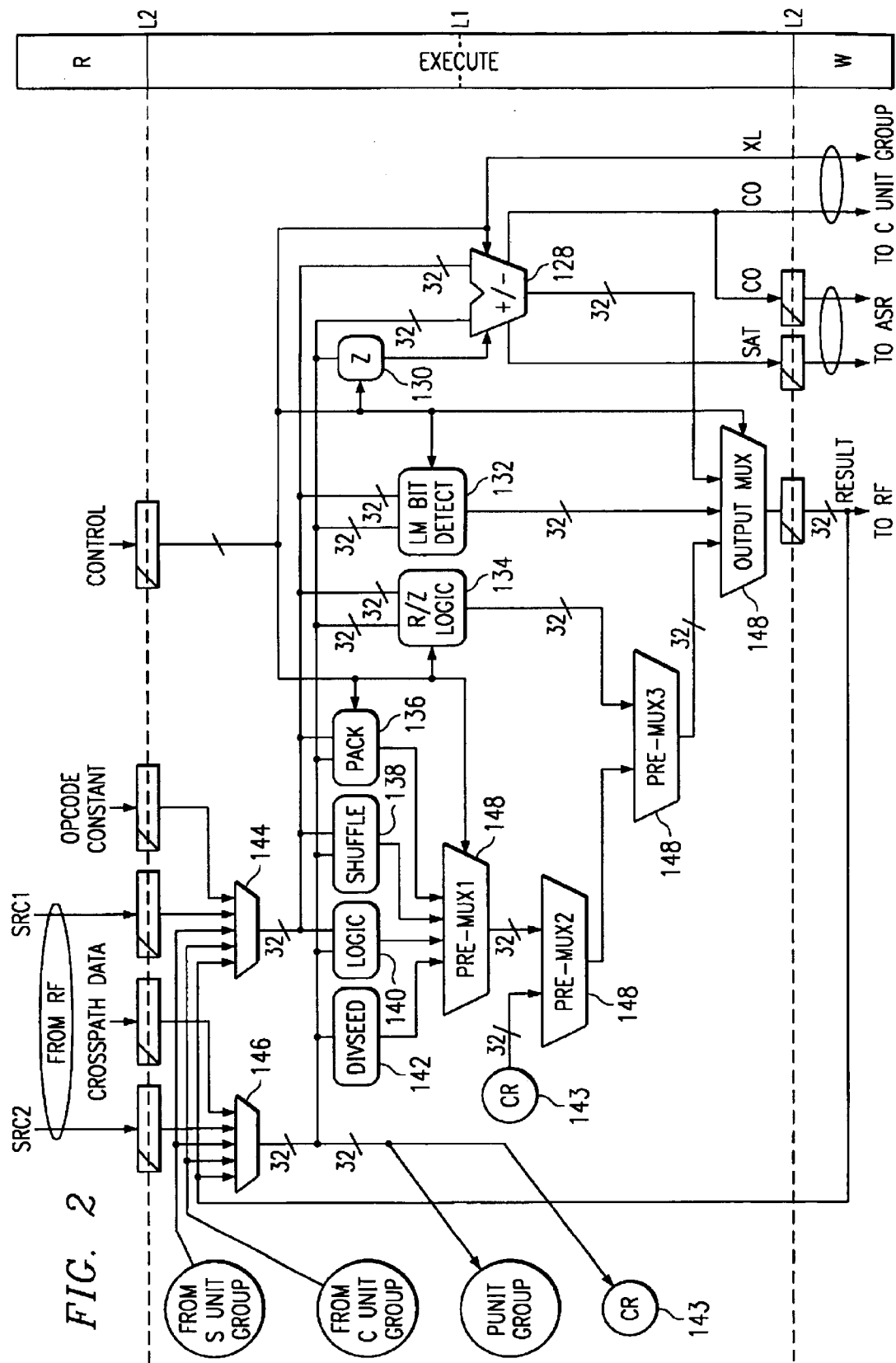
FIG. 2 depicts a top level block diagram of an A unit group supporting arithmetic and logical operations of the DSP core.

FIG. 2 is a top level block diagram of an A unit group, which supports a portion of the arithmetic and logic operations of DSP core 10. A unit group handles a variety of operation types requiring a number of functional units including A adder unit 128, A zero detect unit 130, A bit detection unit 132, A R/Z logic unit 134, A pack/replicate unit 136, A shuffle unit 138, A generic logic block unit 140, and A div-seed unit 142. Partitioning of the functional sub-units is based on the functional requirements of A unit group, emphasizing maximum performance while still achieving low power goals. There are two input muxes 144 and 146 for the input operands, both of which allow routing of operands from one of five sources. Both muxes have three hotpath sources from the A, C and S result busses, and a direct input from register file RF in the primary datapath. In addition, src1 mux 144 may pass constant data from decode unit (not shown), while src2 mux 146 provides a path for operands from the opposite datapath. Result mux 148 is split into four levels. Simple operations which complete early in the clock cycle are pre-muxed in order to reduce loading on the critical final output mux. A unit group also is responsible for handling control register operations 143. Although no hardware is required, these operations borrow the read and write ports of A unit group for routing data. The src2 read port is used to route data from register file (RF) to valid configuration registers. Similarly, the write port is borrowed to route configuration register data to register file RF.

Figure 3:
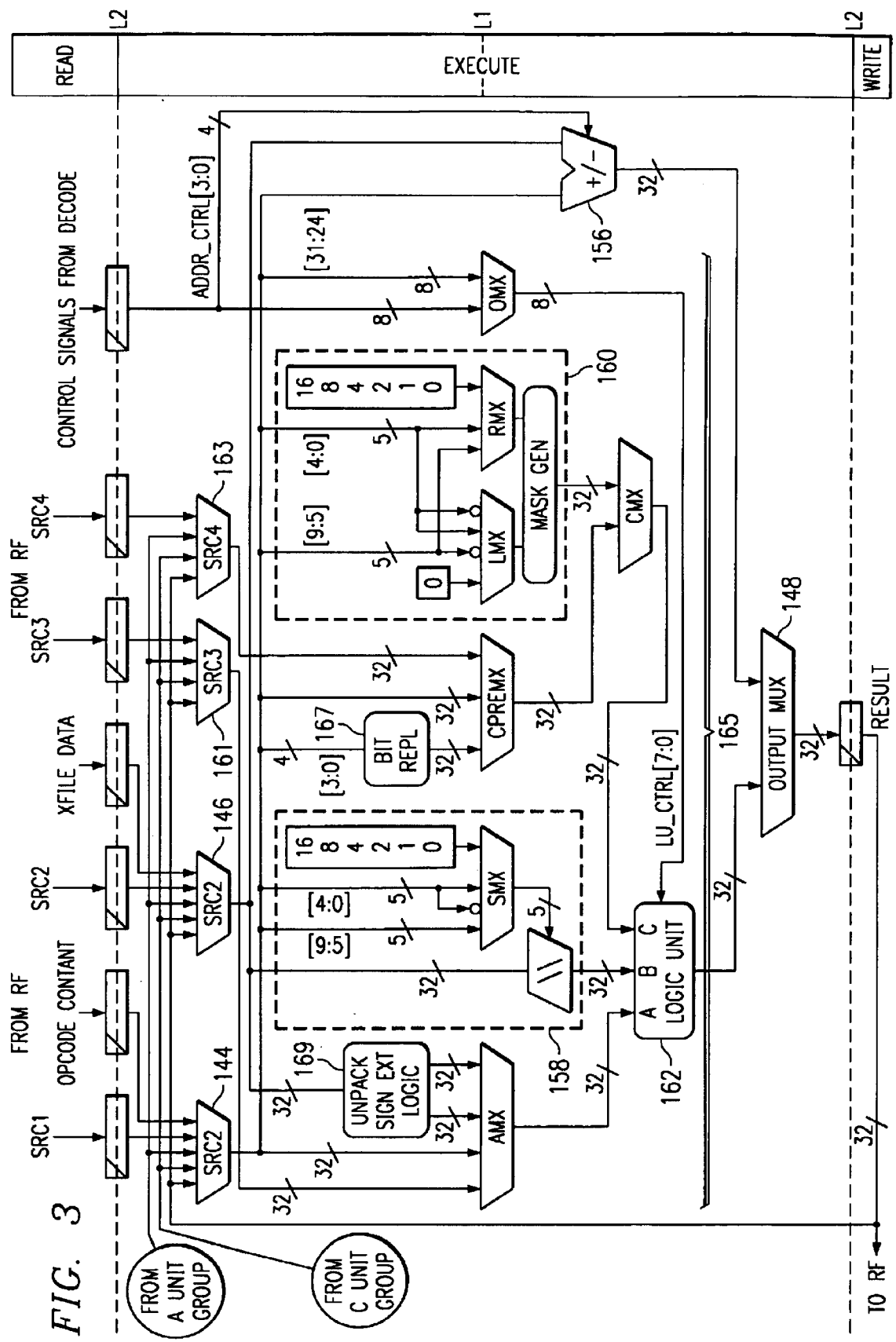
FIG. 3 depicts a top level block diagram of an S unit group supporting shifting, rotating, and Boolean operations of the DSP core.

FIG. 3 is a top level block diagram of S unit group, which is optimized to handle shifting, rotating, and Boolean operations, although hardware is available for a limited set of add and subtract operations. S unit group is unique in the most of the hardware may be directly controlled by the programmer. S unit group has two more read ports than the A and C unit groups, thus permitting instructions to operate on up to four source registers, selected through input muxes 144, 146, 161, and 163. Similar to the A and C unit groups, the primary execution functionality is performed in the Execute cycle of the design. S unit group has two major functional units: 32-bit S adder unit 156, and S rotate/Boolean unit 165. S rotate/Boolean unit 165 includes S rotator unit 158, S mask generator unit 160, S bit replicate unit 167, S unpack/sign extend unit 169, and S logical unit 162. The outputs from S rotator unit 158, S mask generator unit 160, S bit replicate unit 167, and S unpack/sign extend unit 169 are forwarded to S logical unit 162. The various functional units that make up S rotate/Boolean unit 165 may be utilized in combination to make S unit group capable of handling very complex Boolean operations. Finally, result mux 148 selects an output from one of the two major functional units, S adder unit 156 and S rotate/Boolean unit 165, for forwarding to register file RF.

Data flow enhancements include increased instruction set efficiency, including variable shift operations. A BNOP instruction helps reduce the number of instructions required to perform a branch when NOPs are needed to fill the delay slots of a branch. Pipeline discontinuities may arise from various causes, such as memory stalls, the STP instruction, and multi-cycle NOPs. The NOP count instruction provides count cycles for NOPs. If the count is greater than or equal to two (2), the NOP is a multi-cycle NOP. A NOP 2, for example, fills in extra delay slots for the instructors in the execute packet in which it is contained and for all previous execute packets. Thus if a NOP 2 is in parallel with an MPY instruction, the MPY's results are made available for use by instructions in the next execute packet. If the delay slots of a branch complete while a multi-cycle NOP is dispatching NOPs into the pipeline, the branch overrides the multi-cycle NOP, and the branch target begins execution after 5 delay slots. In still another embodiment of the present invention, there are no execute packet boundary restrictions, thereby eliminating a need to pad a fetch packet by adding unneeded NOP instructions.

A method for reducing total code size according to this invention may comprise the steps of determining a latency between a defining instruction, such as a load instruction (LD), and a using instruction, such as an arithmetic instruction (e.g., ADD), to perform a pipelined operation. At least one intervening instruction may be identified between the defining instruction and the using instruction. See Example 1c below. A NOP field then may be inserted into the at least one of the defining and using instructions. For example, the order of the instructions may differ based on the placement of the NOPs:

| 1st order | 2nd order |
| --- | --- |
| inst.1 | inst.1 |
| nop.4 | inst.2 |
| inst.2 | nop.4 |
| inst.3 | inst.3 |

Although the NOP field may be inserted in at any point within the instruction, it may most conveniently be inserted at the end of the instruction, e.g., LD *a0, a5 ,4. In this example, "4" is the NOP field.

Although the method and apparatus of this invention may be used with either load or branch instructions, the branch instructions tend to have more room to receive the additional NOP field. Thus, in a method for reducing total code size during branching, the method may comprise the steps of determining a latency in a shift between a first pipelined operation and a second pipelined operation. The latency may be determined by identifying the branch instruction and the first and second pipelined operations. Further the method may conclude by adding a NOP field to an end of the branch instruction, e.g., B label, 5. In determining the latencies within a code, the code ay be manually or automatically searched to locate sections of code, such as branch operations which will necessitate latencies or delays. Alternatively, a particular program may be run and analyzed to determine the latencies within the program.

An apparatus achieving reduced total code size as a result of this invention may comprise a digital signal processor (DSP), such as a c6x series DSP, available from Texas Instruments, Inc., of Dallas, Tex. The DSP may be encoded with at least one defining instruction and at least one using instruction separated by a latency, for performing a given pipelined operation. As indicated above, a NOP field may be affixed to the end of at least one of the intervening instructions.

Finally, an apparatus for reducing total code size during branching, also may comprise a processor including at least one branch instruction for shifting between a first pipelined operation and a second pipelined operation. The branch instruction and the first and second pipelined operations may determine a latency required to terminate the first pipelined operation between the branch instruction and the branch occurrence. In this apparatus, the NOP field may be affixed to the end of the branch instruction. In the apparatus described herein, the operations and instructions may be performed by software, hardware structures, or a combination thereof.

The invention will be further clarified by a consideration of the following examples, which are intended to be purely exemplary of the use of the invention. As demonstrated by the following examples, the NOP operation may be encoded into or onto the instruction, such that the NOP is an operation issued in parallel with the instruction requiring the latency. Referring to the examples set forth above, the following examples show the code rewritten according to the present invention:

EXAMPLE 1b

| LD *a0, a5, 4 | % "4" (i.e., four (4) cycles or delay slots) is the NOP field |
|---|---|
| ADD a5, 6, a7 | % a5 value available |

EXAMPLE 2b

| B label, 5 | % "5" (i.e., five (5) cycles or delay slots) is the NOP field |
|---|---|
| ; | % branch occurs |

As may be seen from these examples, the NOP field is an instruction operand that ranges from 0 to the maximum latency of the instruction. Nevertheless, other ranges may be applied that may result in further savings on opcode encoding space. Another example is provided below for the LD instruction of Example 1b, in which a value less than maximum latency is used because other instructions are to be scheduled in the instruction's delay slots.

EXAMPLE 1c

| LD*a0, a5, 3 | % "3" (i.e. three (3) cycles or delay slots) is the NOP field |
|---|---|
| ADD a3, 5, a3 | % a new instruction is inserted into the 4th delay slot |
| ADD a5, 6, a7 | % a5 value available |

In still another embodiment of the invention, the latency may be identified within a Branch instruction performing a relative branch with NOPs, i.e., a BNOP. An operation code or Opcode may be the first byte of the machine code that describes a particular type of operation and the combination of operands to the central processing unit (CPU). For example, the Opcode for the BNOP instruction may be formed by the combination of a BNOP (.unit) code coupled with the identification of a starting source (src2) and an ending source (src1) code, e.g., .unit=.S1,.S2. In this format, the src2 Opcode map field is used for the scst12 operand-type unit to perform a relative branch with NOPs using the 12-bit signed constant specified by src2. The constant is shifted two (2) bits to the left, then added to the address of the first instruction of the fetch packet that contains the BNOP instruction. Referring to FIG. 4a, an example of a 32-bit Opcode is depicted showing the BNOP instruction.

The result is placed in the program fetch counter (PFC). Fetch is that portion of a computer cycle during which the next instruction is retrieved from memory. A fetch packet is a block of program data containing up to eight (8) instructions.

The 3-bit unsigned constant, which may be specified in src1, provides the number of delay slot NOPs to be inserted, e.g., from zero (0) to five (5). Thus, for example, with src1=0, no delay slot NOPs are inserted. Consequently, this instruction reduces the number of instructions required to perform a branch operation when NOPs are required to fill the delay slots of a branch.

The following is as an example of such a reduction in the number of instructions required to perform a BNOP. Previously, the code to perform this function would be as follow:

| B | .S1 | Label |
|---|---|---|
| NOP | N | |

According to the present invention, this instruction may be replaced by:

| B | .S1 | Label, N |
|---|---|---| where N is the number of delay slot NOPS to be inserted. Moreover, although BNOP instructions may be predicated, the predication conditions control whether or not a branch is taken, but they do not control the insertion of NOPs. Consequently, when implementing the BNOP instruction, the number of NOPs specified by N are inserted, regardless of the predication condition.

Only one branch instruction may be executed per cycle. If two (2) branch condition controls are in the same execute packet, i.e., a block of instructions that execute in parallel, and if both are accepted, the program behavior is undefined. Further, when a predicated BNOP instruction is used with a NOP count greater than five (5), a C64X processor, available from Texas Instruments, Inc., of Dallas, Tex., will insert the total number of delay slots requested, only when the predicated condition is false. For example, the following set of instructions insert seven (7) cycles of NOPs into the BNOP instruction:

|  | ZERO .L1 | A0 |
|---|---|---|
| [A0] | BNOP .S1 | LABEL,7. |

Thus, the branch is not taken-, and seven (7) cycles of NOPs are inserted. Conversely, when a predicated BNOP instruction is used with a NOP count greater than five (5) and the predication condition is true, the branch will be taken and the multi-cycle NOP will be simultaneously terminated. For example, the following set of instructions insert only five (5) cycles of NOPs into the BNOP instruction:

|  | MVK .D1 | 1,A0 |
|---|---|---|
| [A0] | BNOP .S1 | LABEL,7. |

Thus, the branch is taken, and five (5) cycles of NOPs are effectively inserted.
This is executed as follows:

| if (cond) | {PFC=((PCE1+se(scst12))<<2); |
|---|---|
|  | nop(src1): |
|  | } |
| else | nop (src1+1) |

Referring to FIG. 4b, the pipeline format for performing this branch instruction is depicted. In particular, this figure depicts the relationship between the Read (src2) and Write (PC) steps and the Target Instructions, where the branch is taken at PCE1.

As an example, the instruction: BNOP .S1 30h, 2; calls for certain information in Target Instruction PCE to be moved to PC after the branch is taken. Thus, the following shows the register state before and after the delayed move.

| Before Instruction | After Branch is Taken |
|---|---|
| PCE1 0100 0500h | PCE1 [   ] |
| PC [   ] | PC 0100 0500h |

In yet another embodiment of this invention, an operation code or Opcode again may be the first byte of the machine code that describes a particular type of operation and the combination of operands to the central processing unit (CPU). For example, the Opcode for the BNOP instruction again may be formed by the combination of a BNOP (.unit) code coupled with the identification of a second source (src2) and a first source (src1) code. In this format, the src2 Opcode map field is used for the xunit operand-type unit to perform a absolute branch with NOPs. The register specified in src2 is placed in the program fetch counter (PFC), described above. The 3-bit unsigned constant specified in src1, provides the number of delay slots NOPs to be inserted, e.g., from zero (0) to five (5). Thus, for example, with src1=0, no delay slot NOPs are inserted. Consequently, this instruction also reduces the number of instructions required to perform a branch operation when NOPs are required to fill the delay slots of a branch. Referring to FIG. 5a, an example of a 32-bit Opcode is depicted showing the incorporation of instructions relating to src2 and src1.

The following is as an example of such a reduction in the number of instructions required to perform a BNOP. Previously, the code to perform this function would be as follow:

| B | .S2 | B3 |
|---|---|---|
| NOP | N |  |

According to the present invention, this instruction may be replaced by:

| B | .S2 | B3, N |
|---|---|---| where N is the number of delay slot NOPS to be inserted. Moreover, although this BNOP instruction only may be executed on the .S2 functional unit, src2 may be read from either register file by using a cross-path if necessary.

BNOP instructions again may be predicated. The predication condition controls whether or not the branch is taken, but this condition does not effect the insertion of NOPs. BNOP always inserts the number of NOPs specified by N, regardless of the predication condition.

As noted above, only one branch instruction may be executed per cycle. If two (2) branch condition controls are in the same execute packet and if both are accepted, the program behavior is undefined. Further, when a predicated BNOP instruction is used with a NOP count greater than five (5), a C64X processor, available from Texas Instruments, Inc., of Dallas, Tex., will insert the total number of delay slots requested, only when the predicated condition is false. For example, the following set of instructions insert seven (7) cycles of NOPs into the BNOP instruction:

|  | ZERO .L1 | A0 |
|---|---|---|
| [A0] | BNOP .S1 | B3,7. |

Thus, the branch is not taken, and seven (7) cycles of NOPs are inserted. Conversely, when a predicated BNOP instruction is used with a NOP count greater than five (5) and the predication condition is true, the branch will be taken and the multi-cycle NOP will be simultaneously terminated. For example, the following set of instructions insert only five (5) cycles of NOPs into the BNOP instruction:

|  | MVK .D1 | 1,A0 |
|---|---|---|
| [A0] | BNOP .S1 | B3,7. |

Thus, the branch is taken, and five (5) cycles of NOPs are effectively inserted.
This is executed as follows:

| if (cond) | {src2–>PFC |
|---|---|
|  | nop(src1): |
|  | } |

| | |
|---|---|
| else | nop (src1+1) |

Referring to FIG. 5b, the pipeline format for performing this branch instruction is depicted. In particular, this figure depicts the relationship between the Read (src2) and Write (PC) steps and the Target Instructions, where the branch is taken at PCE1.

As an example, the instruction: BNOP .S2 A5, 2; calls for certain information in Target Instruction PCE to be moved to PC after the branch is taken. Thus, the following shows the register state before and after the delayed move.

| Before Instruction | After Branch is Taken |
|---|---|
| PCE1 0010 0c00h | PCE1 [ ] |
| PC [ ] | PC 0100 f000h |
| A5 0100 f000h | A5 0100 f000h |

Although the invention has been described with respect to preferred embodiments, the foregoing description and examples are intended to be merely exemplary of the invention. The true scope and spirit of the invention is not intended to be limited by the foregoing description and examples, but instead is intended to be commensurate with the scope of the following claims. Variations and modifications on the elements of the claimed invention will be apparent to persons skilled in the art from a consideration of this specification or practice of the invention disclosed herein.

We claim:

1. A method for reducing total code size, comprising the steps of:
    determining a latency between a defining instruction and a using instruction; and
    inserting a NOP field into at least one of said defining and using instruction, said NOP field is inserted at an end of said using instruction, wherein the defining instruction has a delaying effect on the using instruction based on the NOP field.

2. The method of claim 1, wherein said NOP field is inserted into said defining instruction.

3. The method of claim 2, wherein said NOP field is inserted at an end of said defining instruction.

4. A method for reducing total code size during branching, comprising the steps of
    determining a latency after a branch instruction for initiating a branch from a first point to a second point in an instruction stream, and
    inserting a NOP field at end of said banch instruction, wherein the NOP field follows a field indicating the second point.

5. The method of claim 4, wherein said branch NOP field is affixed to an end of said branch instruction.

6. An apparatus having reduced total code size, comprising a processor including at least one defining instruction followed by at least one using instruction, wherein a latency exists between said at least one defining instruction and said at least one using instruction and wherein at least one of said at least one defining and using instruction includes a NOP field,
    said NOP field is inserted at an end of said using instruction, wherein the defining instruction has a delaying effect on the using instruction based on the NOP field.

7. The apparatus of claim 6 wherein said NOP field is inserted into said defining instruction.

8. The apparatus of claim 7, wherein said NOP field is inserted at an end of said defining instruction.

9. An apparatus for reducing total code size during branching, comprising a processor including at least one branch instruction for branching from a first point to a second point in an instruction stream, such that a latency exists in the branching between said first point and said second point, and said at least one branch instruction including comprising at least a NOP field at the end of the branch instruction, wherein the NOP field follows a field indicating the second point.

10. The apparatus of claim 9, wherein said branch NOP field is affixed to an end of said branch instruction.

11. A method for reducing total code size comprising the steps of locating at least one delayed effect instruction followed by NOPs within a code; deleting said NOPs from said code; and inserting at the end of a delaying instruction a NOP field that specifies the deleted NOPs, wherein said deleting NOPs precede said delaying instruction, wherein the delayed effect instruction has a delaying effect on the delaying instruction based on the NOPs.

12. The method of claim 11, wherein said delaying instruction is said locating at least one delayed effect instruction.

13. The method of claim 11, wherein said delayed effect instruction is a load instruction.

14. The method of claim 11, wherein said delayed effect instruction is a branch instruction.

15. An apparatus for reducing total code size comprising a processor including a code containing at least one delayed effect instruction, a delaying instruction including a NOP field at the end of said delaying instruction that specifies NOPs, said NOPs preceding said delaying instruction, wherein the delayed effect instruction has a delaying effect on the delaying instruction based on the NOPs.

16. The apparatus of claim 15, wherein said at least one delayed effect instruction is a load instruction.

17. The apparatus of claim 15, wherein said at least one delayed effect instruction is a branch instruction.

* * * * *